March 17, 1959 — E. P. ANSTETT — 2,877,471
SPRING MOUNTING CLIP
Filed Nov. 7, 1956
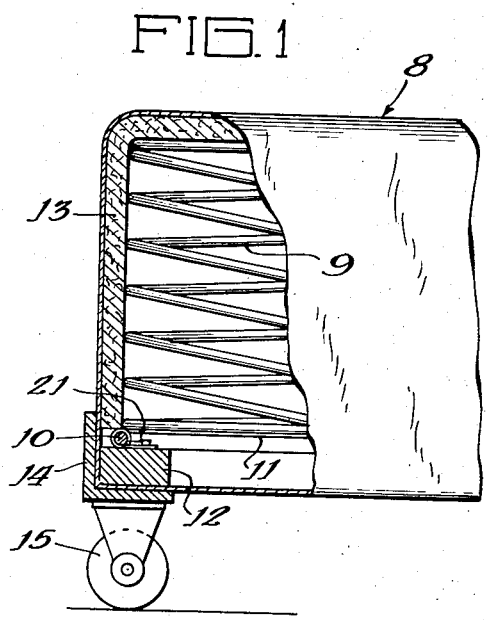
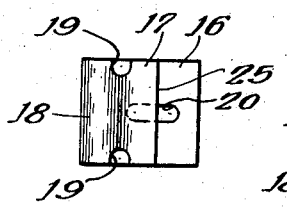
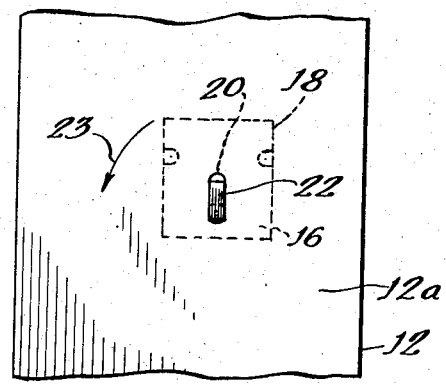
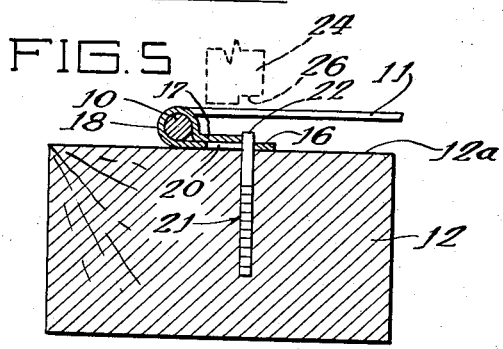
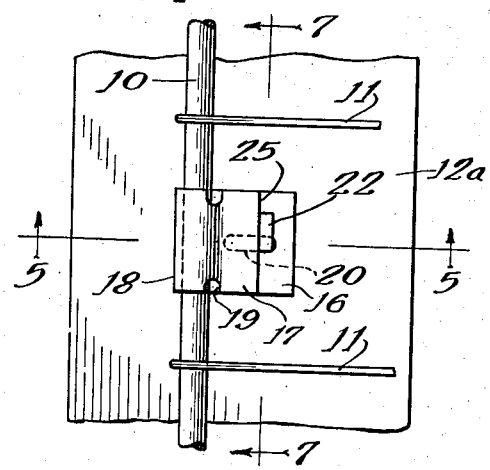
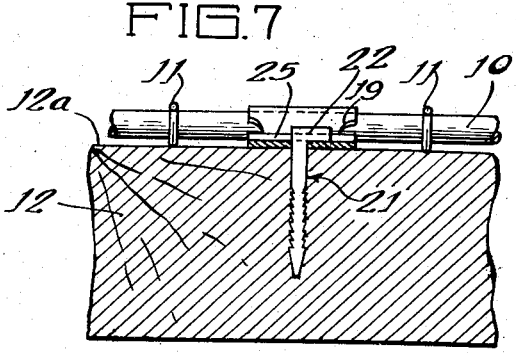
Inventor:
Edgar P. Anstett
By: Schroeder, Hofgren, Brady & Wegner
Attorneys

United States Patent Office 2,877,471
Patented Mar. 17, 1959

2,877,471

SPRING MOUNTING CLIP

Edgar P. Anstett, Chicago, Ill., assignor to No-Sag Spring Company, a corporation of Michigan Application November 7, 1956, Serial No. 620,907

2 Claims. (Cl. 5—259)

This invention relates to a spring mounting clip which may be used for attaching a spring member to a wooden frame more quickly and simply than heretofore possible.

In the past, spring mounting clips of generally U-shape have been used for securing the end wires or border wires of springs to a wooden frame. Ordinarily, the two legs of the clip were dissimilar in length and contained apertures for the reception of two or more nails. Generally, one nail was used to hold the clip to the frame and at least one other nail was later inserted through aligned holes in the two legs to secure the spring within the clip.

The principal object of this invention is to provide a new and improved spring mounting clip.

Another object is to provide a spring mounting clip requiring but a single nail for both mounting the clip on a wooden frame and for locking the spring into the clip.

A further object is to provide a clip permitting the operational steps of securing the clip to the frame and the spring to the clip to be simplified and reduced in number.

Other objects, features and advantages of the invention will be apparent from the following description of a preferred embodiment illustrated in the accompanying drawings, in which;

Figure 1 is a fragmentary broken view of a portion of a box spring for a bed showing the invention therein, Figure 2 is a top plan view of a clip embodying the invention, Figure 3 is a side elevational view of a clip shown in Figure 2, Figure 4 is a fragmentary plan view of the clip as applied to the spring in Figure 1, Figure 5 is a sectional view through the clip taken substantially along line 5—5 in Figure 4, Figure 6 is a fragmentary diagrammatic view showing a step in the attachment of the clip to the frame, and Figure 7 is a fragmentary sectional view through the clip taken substantially along line 7—7 in Figure 4.

Industries involved in the manufacture of furniture have used in the past and currently use a great number of spring clips for attaching various kinds of springs to wooden frames. Where the springs are of coil form mounted within a wire frame or are of flat sinusoidal form, there is generally a wirelike end which may be secured to a wooden frame by the use of a spring clip of this invention. As an example of the use of the spring clip, there is illustrated in Figure 1 of the drawings, a box spring 8 having upright coil springs 9 therein which are secured to a relatively heavy border frame wire 10, and cross wires 11 in turn mounted upon a wooden frame 12. The metal spring structure of the box spring is attached to the wooden frame 12 by use of the spring clips. Also in Figure 1 a covering 13 is shown on the box spring as well as a supporting bed frame 14 with its caster 15 all of which form no part of the invention.

The spring clip itself is a generally U-shape metal piece having legs of dissimilar length. As illustrated in Figures 2 and 3, the clip has a relatively long leg 16 and a short leg 17 joined together by a generally rounded portion 18 forming the base of the U. Semicircular notches or cutouts 19 are formed at the base of the short leg adjacent the rounded base portion 18 of the clip. The notches weakened the material between them relative to the remainder of the clip to an extent insuring that bending of the clip will be concentrated between the notches.

A means for attaching the clip to a wooden frame is provided and herein consists of placing a fastener such as a nail within an elongated slot 20 in the longer leg 16. The slot has generally parallel sides extending lengthwise of the leg and rounded ends as illustrated in Figure 2. The shape of the slot is particularly made for use with a driven type of nail commonly employed in nail driving machines wherein the nails are provided in stick form. Such a nail 21 is illustrated in Figure 5 and 7. The nail may be barbed as illustrated and has an L-shaped head 22 which may be aligned generally with the length of the frame rail 12 by proper positioning of the nail driving machine.

The particular steps in attaching the clip to the frame may most easily be performed by first driving nails 21 into the frame at spaced apart points. The nail heads 22 are allowed to project above the upper surface 12a of the rail to permit the clip to be placed over the head by aligning the slot 20 with the long dimension of the nail head as illustrated in Figure 6. By turning the clip 90° in the direction of the arrow 23 (Figure 6) the clip is mounted upon the rail. Thereafter a tool having a head 24 as shown in the dotted outline in Figure 5, may be used to clinch the shorter leg 17 into face to face contact with the longer leg. The end 25 of the shorter leg is made square and straight so that it may abut against the side of the head 22 as illustrated in Figure 4 and 5, thus locking the clip in place. The stepped end 26 on the head 24 of the clinching tool will serve the dual function of bringing the legs of the clip together and also clinching the nail head 22 against the longer leg. In order to insure proper positioning of the tool 24, guides may be provided for engaging against the wire 10 and forcing it to the extremity of the U-shape base of the clip.

The metal of the clip is sufficiently resistant to bending that once the clip is clinched into the position of Figures 4, 5 and 7, the clip will remain in this position. There is no possibility of metal to metal contact between the wire 10 and the nail 21. Ordinarily the material of which the clip is made is provided with a paper liner which silences any metal to metal squeaking.

The particular advantage of the present clip is that it permits faster operation in attaching a spring section to a frame. Only one nail is required rather than two or more, and there are no apertures in the clip legs which must be maintained in alignment to receive a nail or other driven fasteners. As a result, labor cost is reduced and speed of operation is materially improved.

The foregoing detail description is given for clearness of understanding only and no unnecessary limitations should be understood therefrom for some modifications will be obvious to those skilled in the art.

I claim:

1. A spring mounting clip, comprising: a generally U-shaped member having one leg longer than the other, the longer leg having an elongated slot of generally uniform width extending lengthwise of the leg beyond the short leg, and the shorter leg having an imperforate face and a straight end surface extending laterally across the slot to lock the clip to the head of a driven fastener extending through the slot when the shorter leg is flattened into engagement with said head.

2. A clip assembly for fastening a wire member to a frame, said assembly embodying a U-shaped element having a web from which flanges of unequal length extend, the flange of greater length having an elongated slot disposed longitudinally therein, an L-shaped nail having an elongated body portion extending through said slot and adapted to be driven into a frame, and a shorter head portion projectable through said slot when the body portion is at either end thereof, the shorter of said flanges overlying a portion of said slot and adapted to be flattened into engagement with a side of said head portion to retain the U-shaped element in predetermined position on a frame.

References Cited in the file of this patent
UNITED STATES PATENTS

| | | |
|---|---|---|
| 1,283,194 | Hunt | Oct. 29, 1918 |
| 2,717,635 | Stanton | Sept. 13, 1955 |